US007465051B2

(12) United States Patent
Grueger

(10) Patent No.: US 7,465,051 B2
(45) Date of Patent: Dec. 16, 2008

(54) APPARATUS AND METHOD FOR GENERATING AN IMAGE

(75) Inventor: Heinrich Grueger, Dresden (DE)

(73) Assignee: Fraunhofer-Gesellschaft zur Foerderung der angewandten Forschung e.V. (DE)

( * ) Notice: Subject to any disclaimer, the term of this patent is extended or adjusted under 35 U.S.C. 154(b) by 470 days.

(21) Appl. No.: 11/242,979

(22) Filed: Oct. 4, 2005

(65) Prior Publication Data

US 2006/0082736 A1 Apr. 20, 2006

(30) Foreign Application Priority Data

Oct. 15, 2004 (DE) .................. 10 2004 050 351

(51) Int. Cl.
*G03B 21/26* (2006.01)
(52) U.S. Cl. .................. 353/28; 353/122; 353/42
(58) Field of Classification Search ............. 353/42–45, 353/69, 70, 76, 77, 100, 101, 121, 122, 28; 348/744–747, 771; 345/619, 649, 650, 701, 345/716, 156–162
See application file for complete search history.

(56) References Cited

U.S. PATENT DOCUMENTS 5,786,946 A  7/1998  Imura ................. 359/695

| 6,554,431 B1* | 4/2003 | Binsted et al. ................. 353/28 |
| 6,765,544 B1* | 7/2004 | Wynne Willson ............... 345/6 |
| 2002/0021418 A1* | 2/2002 | Raskar ........................ 353/69 |
| 2004/0223126 A1* | 11/2004 | Hatakeyama et al. ....... 353/122 |
| 2006/0234784 A1* | 10/2006 | Reinhorn ................. 455/575.1 |

FOREIGN PATENT DOCUMENTS

| EP | 0940117 | 8/1999 |
| EP | 1238324 | 10/2003 |
| JP | 2003149729 | 5/2003 |

* cited by examiner

*Primary Examiner*—Andrew T Sever
(74) *Attorney, Agent, or Firm*—Beyer Law Group LLP

(57) ABSTRACT

An apparatus for generating an image comprises a projection means, which is designed to generate an image on a projection area, a detection means, which is designed to generate a detection means signal in dependence on a position or change of position of the projection means, and a control means, which is designed to control the image generated by the projection means based on the detection means signal. A method for generating an image comprises detecting a position or change of position of a projection means via a detection means, generating a detection means signal by the detection means in dependence on the position or change of position and controlling the image generated by the projection means on a projection area based on the detection means signal.

17 Claims, 5 Drawing Sheets

APPARATUS AND METHOD FOR GENERATING AN IMAGE

CROSS-REFERENCE TO RELATED APPLICATION

This application claims priority from German Patent Application No. 102004050351.6, which was filed on Oct. 15, 2004 and is incorporated herein by reference in its entirety.

BACKGROUND OF THE INVENTION

1. Field of the Invention

The present invention relates to an apparatus and method for generating an image.

2. Description of the Related Art

Many mobile devices, such as mobile phones, PDAs or personal digital assistants, respectively, mobile playing systems or game boys, respectively, combinations of mobile phones and PDAs, such as referred to as smart phones or communicators in the literature, and mobile computers, such as laptops, sub-notebooks or handhelds, respectively, use display units for representing data, images and other information. Mainly, display units built into the system are used, preferably LCDs or liquid crystal displays, respectively, or OLED displays or organic light-emitting diode displays, respectively, which can be used in monochrome or colored displays. A further new approach is the usage of projection units, which project images on any surface type. This can be performed by fine-mechanical deflection units, micro-mechanical projection systems or differently designed light deflection units, such as so-called SLMs (SLM=spatial light modulator). These SLMs are often embodied in the form of micro-mirror arrays. Currently, systems are being designed that can display a color image the size of at least a normal screen in color from a unit of several cubic centimeters in size.

For displaying the screen content of mobile computers and also of video replay systems, more and more projection devices, so-called beamers, are used, which generate an image consisting of many individual elements.

The displays of portable devices are very limited in size and are thus at most suitable for a display for one person in a narrow partial area of the field of view. Projection units only display an undisturbed image when the system is in an absolutely still position. Hereby, the usage in mobile and portable units is only very limited. The usage of the device while it is handheld leads to extremely limited quality. Additionally, vibrations lead to negative effects on the image quality in projection units.

SUMMARY OF THE INVENTION

It is an object of the present invention to provide an apparatus for generating an image where the quality of the image is improved, and a method for generating an image where the quality of the image is improved.

In accordance with a first aspect, the present invention provides an apparatus for generating an image, having: a projection means, which is designed to generate an image on a projection area; a detection means, which is designed to generate a detection means signal in dependence on a position or change of position of the projection means; and a control means, which is designed to control the image generated by the projection means based on the detection means signal.

In accordance with a second aspect, the present invention provides a mobile phone using the apparatus for generating an image, having: a projection means, which is designed to generate an image on a projection area; a detection means, which is designed to generate a detection means signal in dependence on a position or change of position of the projection means; and a control means, which is designed to control the image generated by the projection means based on the detection means signal.

In accordance with a third aspect, the present invention provides a joystick using the apparatus for generating an image, having: a projection means, which is designed to generate an image on a projection area; a detection means, which is designed to generate a detection means signal in dependence on a position or change of position of the projection means; and a control means, which is designed to control the image generated by the projection means based on the detection means signal.

In accordance with a fourth aspect, the present invention provides a method for generating an image, having the steps of: detecting a position or change of position of a projection means via a detection means; generating a detection means signal by the detection means in dependence on the position or change of position; and controlling an image generated by the projection means on a projection area based on the detection means signal.

The present invention is based on the knowledge that it is possible to generate stationary representations on a projection area also with mobile devices, by providing an apparatus for generating an image with a detection means, which determines a position or a change of position of a projection means, and thereupon generates a detection means signal such that the control means receiving the detection means signal can control the image generated by the projection means in dependence on the position or change of position of the projection means. Thereby, it can be avoided that changes of position of the image on a projection area occur due to a change of position of the projection means.

The inventive apparatus consists of a projection unit, a control unit and appropriate sensor technology or detection means, respectively, for determining the position or change of position of the system. If the sensor technology detects a change of position of the system and thus the projection unit, the illustration to be imaged is correspondingly rotated or shifted by the control unit, such that the image remains statically unchanged for the viewer.

For imaging, the inventive apparatus for generating an image achieves a significant improvement of quality. The possibility of mobile imaging with portable devices obtains an improved quality with regard to image size and quality.

For mobile applications, particularly games, that can be played with mobile units, the possibility of integrating the input unit in a single system results. Thereby, by using the present invention, projection systems can be implemented, where the detection means signal is not only evaluated by the control means for controlling the projection means but also by a further computing means. The further computing means can then use the detection means signal as a control parameter for an application running on the same.

A cursor could, for example, be moved in the image in dependency on the movements of the apparatus or the input device, respectively. Thereby, the inventive apparatus can take over the function of a conventional input apparatus, such as a mouse or a joystick, for controlling programs. The position detection in the inventive apparatus can also be used to realize the function of a game input device in a car race game in the form of a racing wheel. Although the apparatus is used as control means for an application, the generated image on the projection area remains always in the same position, since the projection means integrated in the input device is controlled to compensate the change of position of the projection means.

BRIEF DESCRIPTION OF THE DRAWINGS

These and other objects and features of the present invention will become clear from the following description taken in conjunction with the accompanying drawings, in which:

FIG. 2b is a view of an alternative embodiment of the elements shown in FIG. 2a;

DESCRIPTION OF THE PREFERRED EMBODIMENTS

Figure 1:
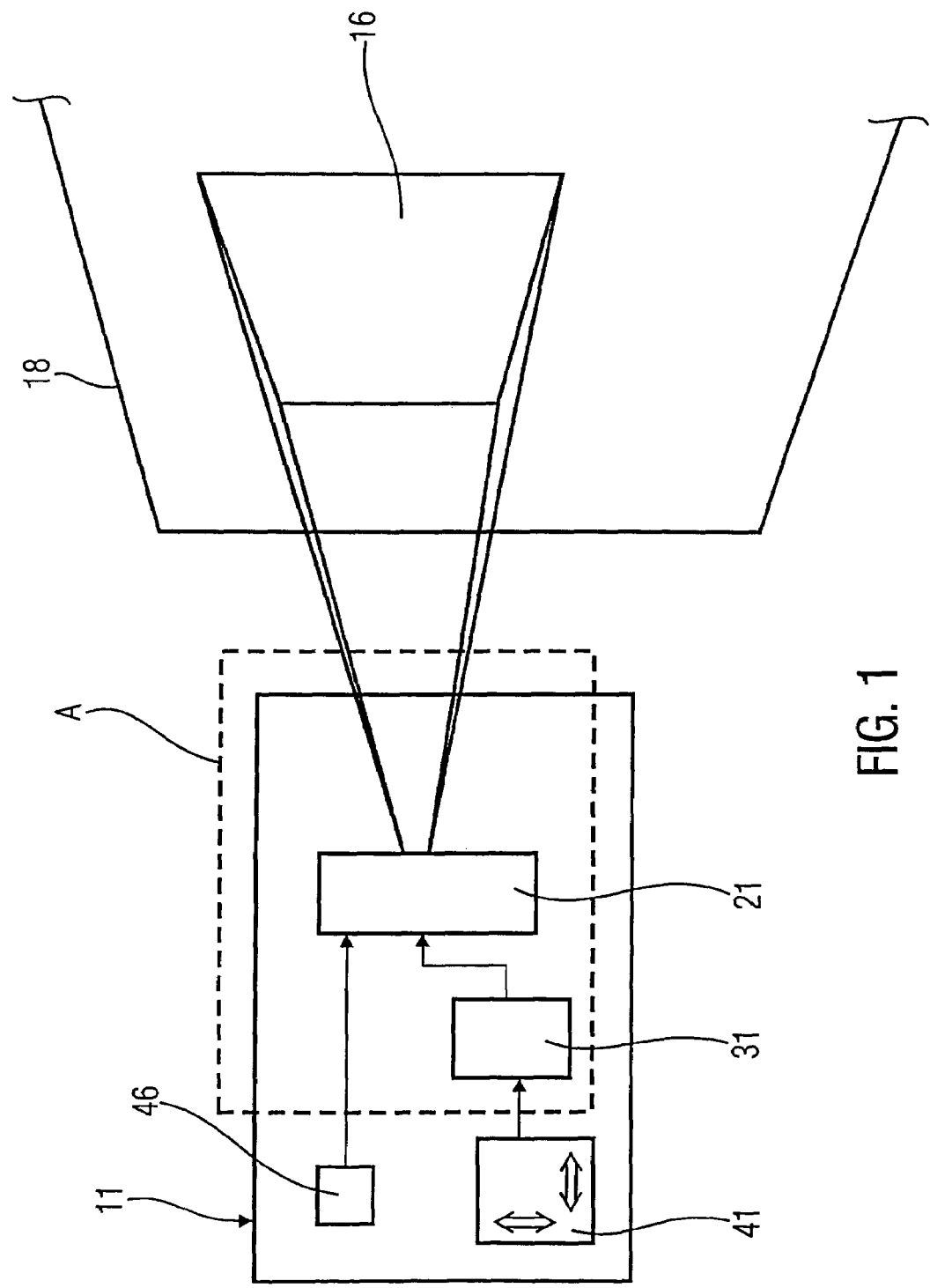
FIG. 1 is an apparatus for generating an image according to an embodiment of the present invention.

In FIG. 1, an apparatus 11 for generating an image 16 is illustrated. The apparatus 11 comprises a projection means 21, a control means 31, a detection means 41 and an image source 46.

The control means 31 is connected to a detection means 41 to receive a detection means signal from the same. Further, the control means is connected to the projection means 21 to control the same. The projection means 21 is connected to the image source 46 and receives an image signal from the same.

Based on the image signal received from the image source 46, the projection means 26 generates an image 16 on a projection area, for example a wall 18 of a room. The detection means 41 detects the movements and thus changes of position of the apparatus 11 and correspondingly of the projection means 21, such as vibrating or tilting of the apparatus 11 and generates a detection means signal based on the detected movements. The control means 31 receives the detection means signal, evaluates the same and generates a control signal for controlling the projection means 21 based thereon.

Thereby, the projection means 21 is controlled such that a change of position of the image 16 generated by a change of position of the projection means 21 is compensated. In other words, the projection means 21 is controlled such that the image 16 remains in a stationary position, even when the projection means 21 changes its position.

By evaluating the change of position of the projection means 21 and the subsequent control of the projection means 21, so that the change of position is compensated, it is possible to generate a still high-quality image even during movements of the projecting system or projecting means 21, respectively, to a certain extent, or with changes of positions by rotating, tilting or vibrating the device. By using the apparatus 11 for generating the image 16 it is possible to suppress oscillations or vibrations of imaging units, such as beamers, on tables or the same or of insufficiently vibration-resistant ceiling or wall mounting.

The illustrated detection means 41 or sensor technology can detect a change of position of the system or the apparatus 11, respectively, for generating the image 16, which is accompanied by a change of position of the projection means 21.

The image 16 can then be rotated or shifted by the control means 31 via controlling the projection means 21, such that the image remains statically unchanged, i.e. stationary, for the viewer.

Here, software-based mathematical correction methods can be used in the projection means 21, which determine, from the control means signal, a change of position of the image 16 to be performed, and correct information about the image 16 present in digital form which has been transmitted from the image source 46 via the image signal to the projection means 21. In that case, a computing unit whereon these software correction methods are performed is integrated into the projection means 21. Simultaneously, mirrors or lenses can be used to change the position of the image 16 on the projection area 18.

The detection means can, for example, be formed as a system of rotation rate sensors and acceleration sensors, preferably of three rotation rate sensors and three acceleration sensors each to detect the movements in all directions of the room. Ideally, the three rotation rate sensors are disposed such that they can each detect a rotational movement around an x rotation axis, an y rotation axis and a z rotation axis, wherein the x rotation axis, the y rotation axis and the z rotation axis are each disposed vertically to each other within predetermined tolerances.

The image source 46 is often designed as an application with a computing unit and corresponding software for generating an image.

Figure 2A:
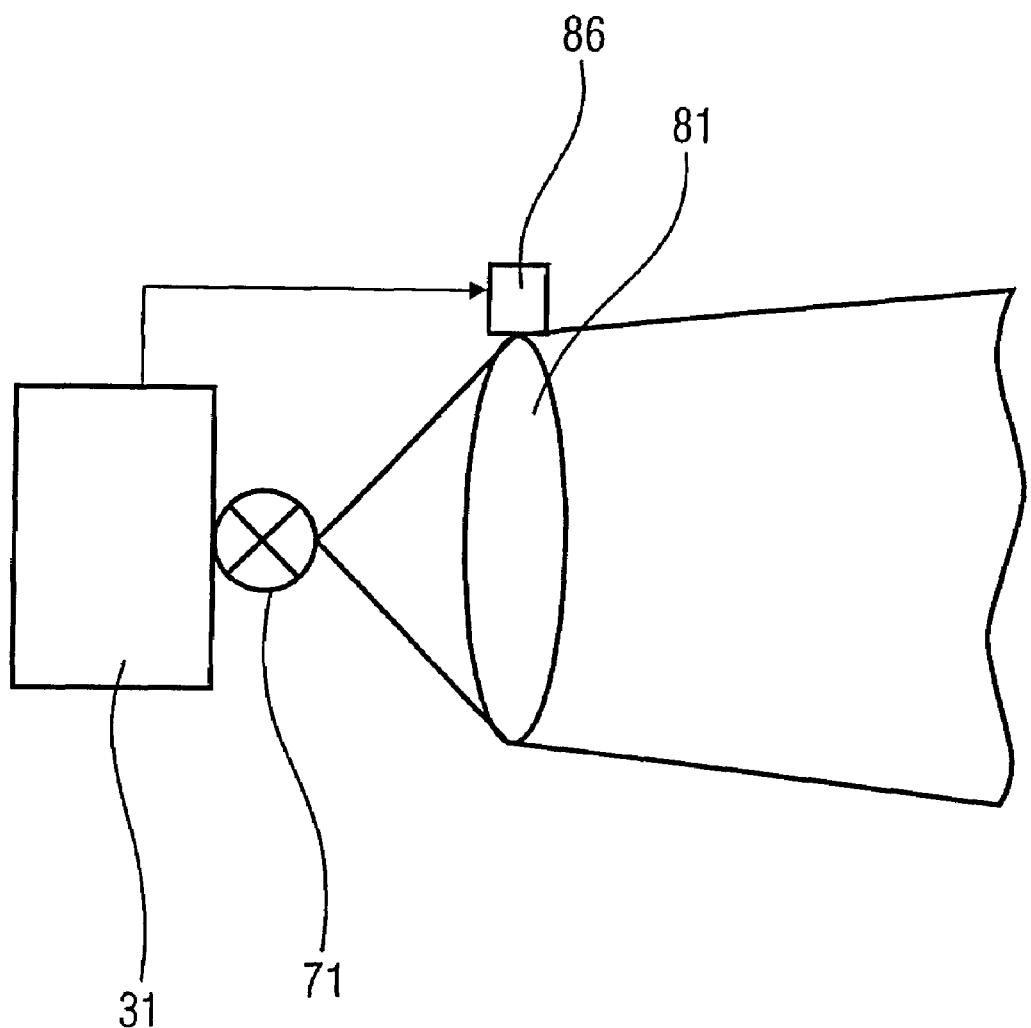
FIG. 2a is a detailed view of an embodiment of a control means and a projection means of FIG. 1.

In FIG. 2a, an embodiment of the elements shown in section A in FIG. 1 is discussed. In the following description of the preferred embodiments, the same or similar elements are provided with the same reference numbers. In the embodiment shown in FIG. 2a, the projection means 21 is realized via a light source 71 and a lens 81 with a fine-mechanical deflection unit 86.

The fine-mechanical deflection unit 86 is connected to the control means 31 to receive the control means signal from the same. Additionally, the fine-mechanical deflection unit 86 is mechanically connected to the lens 81. In this embodiment, the image source 46 controls the light source 71 and thus controls the content of image 16.

The control means 31 adjusts the lens 81 via the fine-mechanical deflection unit 86, such that the image 16 shown in FIG. 1 remains in its stationary position on the wall 18. The deflection unit 86 mechanically connected to the lens 81 can rotate the lens or tilt it and thus adjust the image 16. Here, the refractive effect of the lens 81 is used, which controls the curve of the light rays from the light source to the image 16.

Figure 2B:
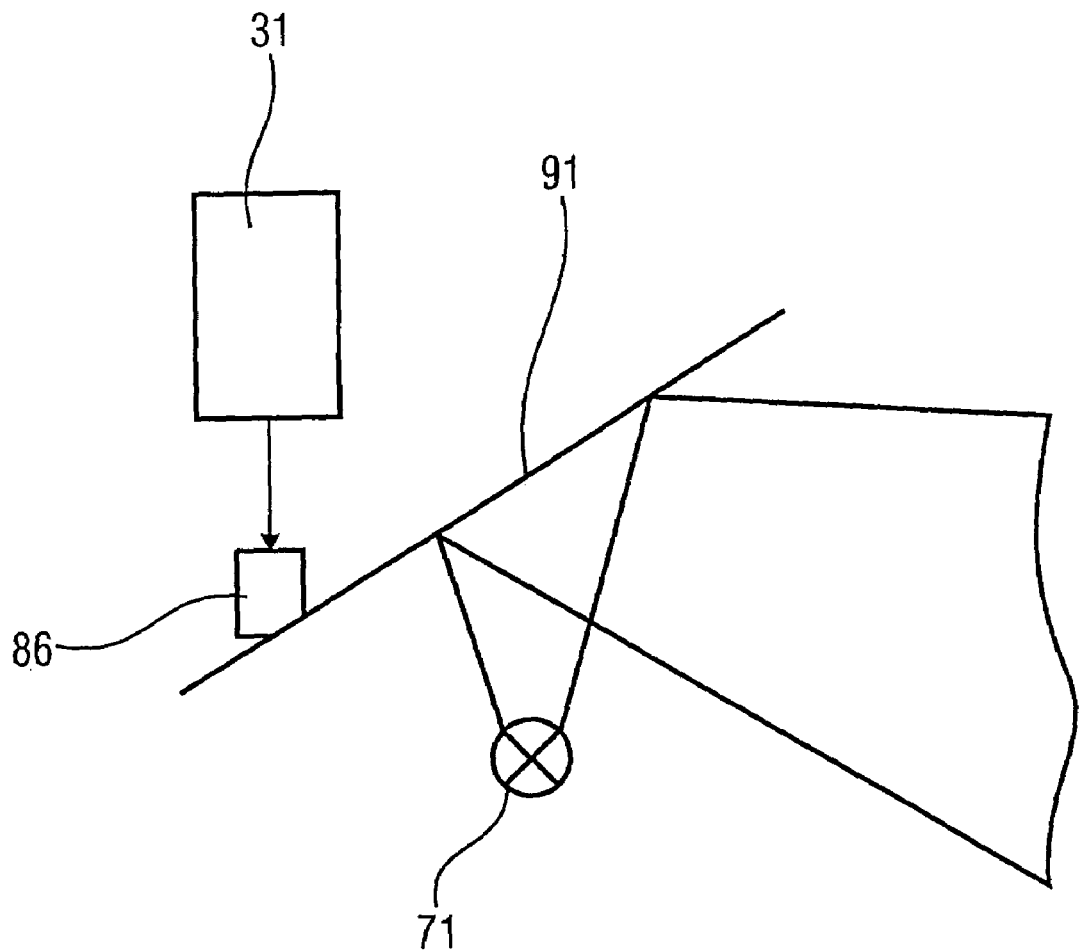

FIG. 2b shows an alternative embodiment of the projection means 21 shown in FIG. 2a. Again, the mode of operation of the elements shown in FIG. 1 in section A is discussed in more detail. The shown alternative embodiment of the projection means 21 comprises a mirror 91 with the fine-mechanical deflection unit 86.

The mirror 91 is mechanically connected to the fine-mechanical deflection unit 86.

The light rays generated by the light source 71 are reflected at the mirror 91. The control means signal generated by the control means 31 is received by the fine-mechanical deflection unit 86. Via the fine-mechanical deflection unit 86, the control means 31 adjusts the mirror in its position such that the image 16 shown in FIG. 1 remains at a stationary location on the wall 18 when the apparatus 11 is tilted or rotated. The light rays originating from the light source 71 are reflected on their way to the projection area 18. Here, the reflection of the light rays at the mirror 91 is controlled by the fine-mechanical deflection unit 86.

The mirror shown here is, for example, formed as a micro-mechanically produced biaxially deflectable mirror, which reflects the light coming from one or several light sources during generation of the image.

The embodiments of the present invention shown above can be used in future generations of mobile phones. An image 16 can be projected onto any surface in a room by a mirror 91 deflectable in two directions, which can often be formed as micro-mirror, and typically three light sources with the colors red, green and blue. Preferably, the light sources have a controllable intensity. Advantageously, a color-modulatable light source could be used instead of the three light sources in red, green and blue.

The position detection in the mobile phone can also be performed by an appropriate sensor technology, which is implemented in the detection means 41. Thereby, the detection means 41 realizes movements of the mobile telephone and stabilizes the represented image or the picture 16, respectively, by a corresponding compensation of the movement during imaging.

A user of the mobile phone with an apparatus 11 according to an embodiment of the present invention can view an image 16 projected by a mobile telephone onto a projection area 18 in the environment of the user while his hand is moving intentionally or unintentionally. Thereby, the dimensions of the image 16 can be significantly larger than the dimensions of the LCD display. Thereby, displays with a significantly higher information content in mobile phones are possible compared to the ones in conventional LCD displays.

As explained above, the rotation rate sensors implemented in the detection means 41 detect the movements of the hand of the user. Thereupon, the control means 31 controls the fine-mechanical deflection unit at the micro-mirror 91, such that the image 16 originally generated by the image source 71 remains in the unchanged position on the projection area 18.

Figure 3A:
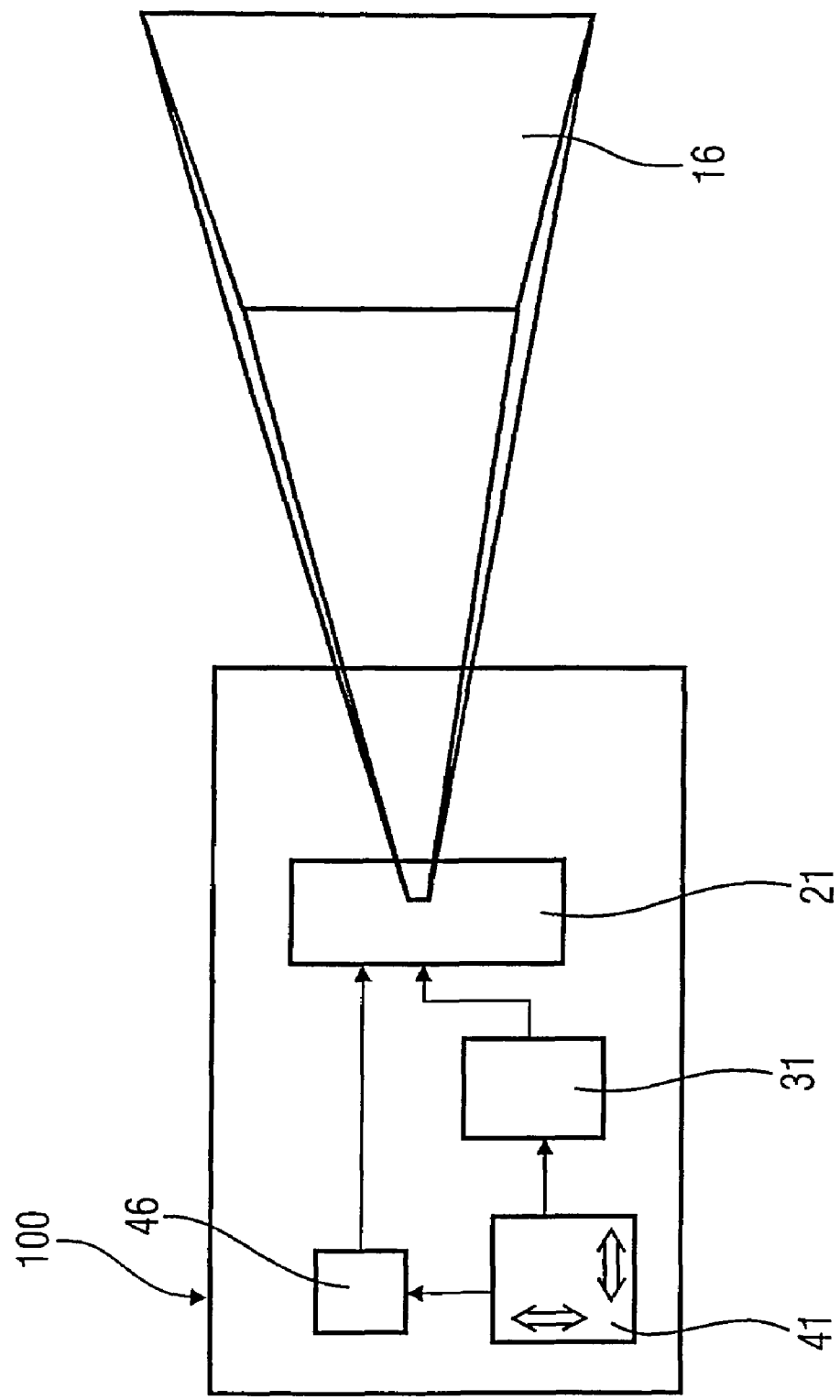
FIG. 3a is an input device according to an embodiment of the present invention.

FIG. 3a shows a further embodiment of the present invention, where the inventive apparatus for generating the image 16 is further used as an input device 100. The input device 100 can, for example, be used in a mobile car race game.

Compared to the apparatus 11 shown in FIG. 1 for generating the image 16, the image source 46 is connected to the detection means 41 in the input device 100, which also generates the image 16.

The image source 46 receives the detection means signal from the detection means 41. The image source 46 evaluates this detection means signal and generates an image signal based on the detection means signal. The image signal is then retransmitted to the projection means 21 as in the apparatus shown in FIG. 1.

Thereby the content of image 16 depends on the position or change of position of the input device 100, respectively.

In contrast to the apparatus shown in FIG. 1, the content of the image 16 changes in dependence on a position or a change of position of the input device 100, respectively.

Thus, for example, a mobile car race game can be realized, where the input device serves both as the projector, which projects the outlines of a road onto a wall, as well as a joystick detecting the commands of a player or a driver, respectively.

Figure 3B:
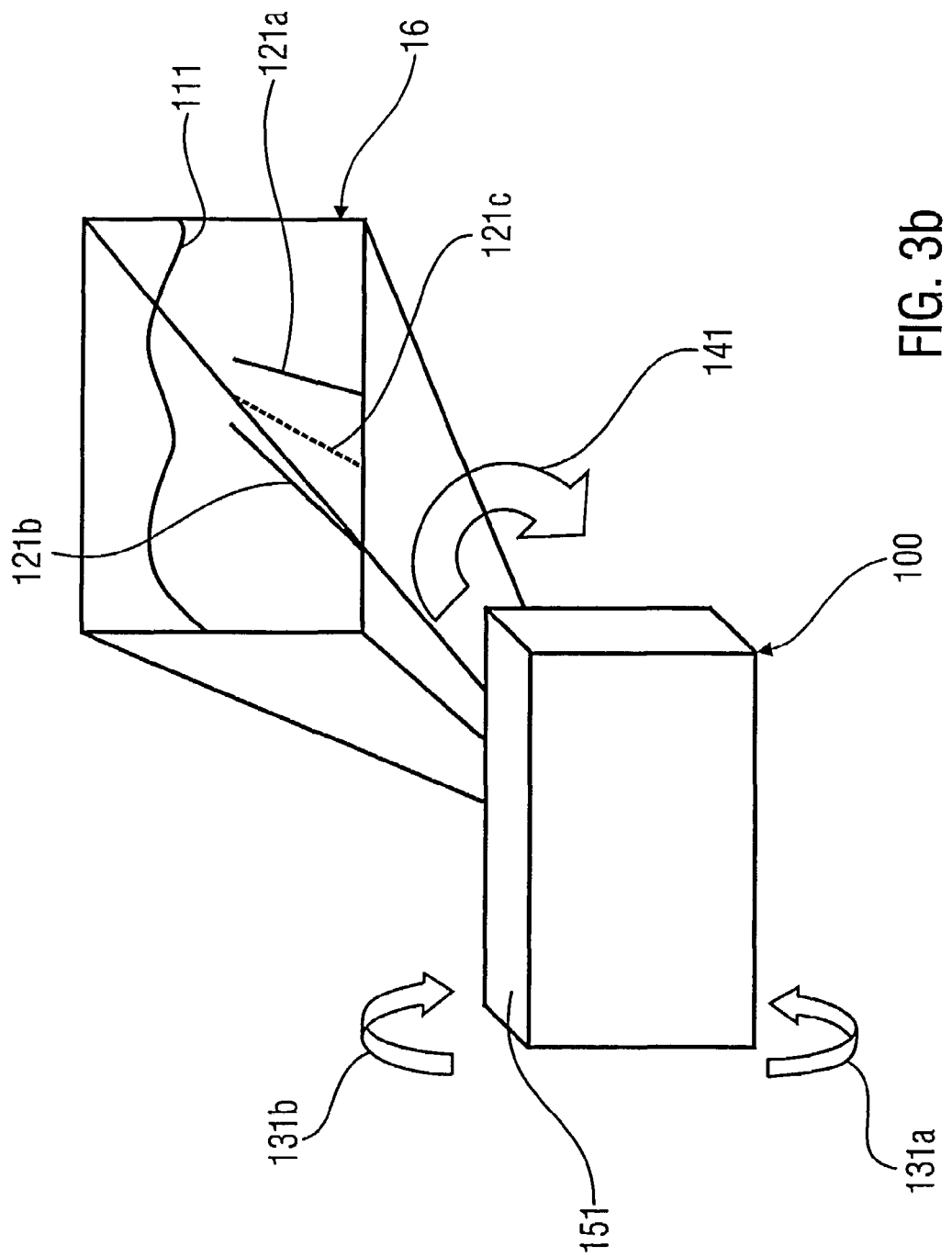
FIG. 3b is an explanation of the use of the input device according to the present invention in a car race game.

FIG. 3b explains the mode of operation of the car race game, which uses the input device 100. The input device 100 projects the image 16, which shows the field of view of a car driver, to the wall 18. Here, the image 16 shows right lane markings 121a, left lane markings 121b and a median strip 121c. The road fenced in by the right lane markings 121a and the left lane markings 121b leads to a horizon 111.

In a resting position, the input device 100 is disposed such that a surface 151 is disposed perpendicular to the projection area onto which the image 16 is projected.

A first arrow 131a symbolizes a tilting movement of the apparatus 11 from the resting position backwards, i.e. the surface 151 of the interactive apparatus 100 shown in FIG. 3b tilts such that the surface 151 faces away from the projection area onto which the image 16 is projected.

Tilting the input device 100 backwards, as illustrated in the first arrow 131a, is detected by the control means 31 via the detection means signal, whereupon the same controls the projection means 21 such that the image 16 remains in its position on the projection area 18.

Simultaneously, the image source 46 detects by evaluating the detection means signal that a backwards tilting movement has taken place and interprets this as a command of the player to slow down the speed of the vehicle in the car race game, which is not shown here. Here, the image source 46 is designed as a computing unit whereon the software for the car race game is processed. Then, the software for the image source 46 provides such an image signal curve to the projection means 21 that the generated image sequence, which the driver or player, respectively, sees, implies a slower vehicle in the car race game.

This applies analogously for a forward tilting movement, which is symbolized in the second arrow 131b. Here, the position of the image 16 on the projection area 18 is also not changed, even when the input device 100 is tilted forwards. Simultaneously, upon the forwards tilting movement, the projection means 21 provides a sequence of the images 16, which imply an acceleration of the vehicle in the mobile car race game to the driver.

A third arrow 141 symbolizes a rotation of the input device 100. The rotational movements of the input device 100 are thereby interpreted as a steering movement by the image source 46 during the evaluation of the detection means input signal. Thereupon, the projection means 21 generates a respective sequence of images 16, which correspond to a movement of the vehicle in the car race game towards the right or the left.

In the input device 100, an interaction by the feedback loop of the person or player, respectively, is possible merely by a change of position of the same without further input means such as keys, etc.

In a similar way as in the mobile car race game shown in FIG. 3b, the input device 100 according to an embodiment of the present invention can also be used for controlling a cursor or a mouse pointer, respectively, in the image 16 on the projection area 18, wherein again an action is triggered by corresponding movements of the input device 100.

By using the input device 100 shown in FIG. 3a, it is possible to build mobile systems integrating imaging, computer unit and input unit in one unit. As has already been explained, these can then be used, for example, in a computer mouse or a joystick.

The above embodiments of the present invention are used everywhere where images, graphics, data or the like are projected by a mobile device. This can be portable small devices, such as mobile phones, projectors, such as so-called beamers for mobile computers or other projection units in mobile applications, such as displays in vehicles or so-called head-mounted displays.

In the above embodiments, an apparatus for projecting an image to or onto a surface or a projection area, respectively, is discussed, wherein the apparatus comprises a means for imaging, a control means and a position detection sensor technology to determine and consider changes of position or orientation of the system during imaging. Here, it is advantageous to stabilize the position of the image during changes of the position or orientation of the imaging system. Preferably, the image is controlled by a micromechanically produced projection unit.

In the above embodiments, it is the aim to fully compensate the change of position of the image 16 generated by the change of position of the apparatus 11. Alternatives to this are, however, any partial compensations of the change of position of the image 16 generated by the change of position of the apparatus 11 or further alternative control methods changing the position of the image 16 on the projection area 18 upon a change of position of the projection means 21.

In the above embodiments, the compensation of the change of position of the image 16 can be performed via mathematical correction methods in the projection means 21, via adjusting the position of a lens 81 or via adjusting the position of a mirror 91 reflecting the image. Alternatives to this are any methods which are performed by the projection means 21, with the aim of compensating a change of position of the image generated by the projection means 21.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for generating an image, comprising:
   an image source;
   a projector, which is designed to generate an image on a projection area based on an image signal received from the image source;
   a detector, which is designed to generate a detector signal in dependence on a position or change of position of the projector; and
   a controller, which is designed to control the image generated by the projector based on the detector signals,
   wherein the image source is configured to adapt a content of the image shown by the apparatus or a sequence of images, respectively, based on the detector signal received by the image source.

2. The apparatus according to claim 1, wherein the controller is designed to maintain the image generated by the projector in a stationary position.

3. The apparatus according to claim 1, wherein the detector comprises a rotation rate sensor.

4. The apparatus according to claim 3, wherein the detector comprises three rotation rate sensors.

5. The apparatus according to claim 4, wherein the three rotation rate sensors are disposed and designed such that a first rotation rate sensor detects a rotational movement around an x axis, a second rotation rate sensor detects a rotational movement around an y axis and a third rotation rate sensor detects a rotational movement around a z axis, wherein the x axis, the y axis and the z axis are each disposed perpendicular to each other within predetermined tolerances.

6. The apparatus according to claim 1, wherein the projector comprises a deflectable miffor.

7. The apparatus according to claim 6, wherein the deflectable mirror is biaxially tiltable.

8. The apparatus according to claim 7, wherein the deflectable miffor is tiltable around an x rotation axis and an y rotation axis, wherein the x rotation axis and the y rotation axis are disposed perpendicular to each other within predetermined tolerances.

9. The apparatus according to claim 1, comprising three image sources spaced apart from each other.

10. The apparatus according to claim 1, which is formed to move a cursor in dependence on the detector signal in the image generated by the projector.

11. The apparatus according to claim 1, wherein the image source includes an application generating the image signal and wherein the image source is adapted to use the detector signal as a control parameter for the application.

12. A mobile phone comprising:
    an image source;
    a projector, which is designed to generate an image on a projection area based on an image signal received from the image source;
    a detector, which is designed to generate a detector signal in dependence on a position or change of position of the projector; and
    a controller, which is designed to control the image generated by the projector based on the detector signal,
    wherein the image source is configured to adapt a content of the image shown by the apparatus or a sequence of images, respectively, based on the detector signal received by the image source.

13. The mobile phone according to claim 12 wherein the image source includes an application generating the image signal and wherein the image source is adapted to use the detector signal as a control parameter for the application.

14. A joystick comprising:
    an image source;
    a projector, which is designed to generate an image on a projection area based on an image signal received from the image source;
    a detector, which is designed to generate a detector signal in dependence on a position or change of position of the projector; and
    a controller, which is designed to control the image generated by the projector based on the detector signals,
    wherein the image source is configured to adapt a content of the image shown by the apparatus or a sequence of images, respectively, based on the detector signal received by the image source.

15. The joystick according to claim 14 wherein the image source includes an application generating the image signal and wherein the image source is adapted to use the detector signal as a control parameter for the application.

16. A method for generating an image by means of a device for generating an image comprising an image source and a projector, comprising the steps of:
    detecting a position or change of position of the projector via a detector;
    generating a detector signal by the detector in dependence on the position or change of position;
    adapting a content of the image shown by the apparatus or a sequence of images, respectively, based on the detector signal received by the image source; and
    controlling the image generated by the projector on a projection area based on the detector signal, the projector generating the image based on an image signal from the image source.

17. The method according to claim 16, wherein the image source includes an application generating the image signal and wherein the method further comprises:
    using the detector signal as a control parameter for the application.

* * * * *